April 24, 1956 F. G. HOLMES 2,742,971

REMOTE CONTROL ELECTRONIC TELEPHONE DIALING MEANS

Filed Sept. 18, 1953 4 Sheets-Sheet 1

INVENTOR.
FRANK G. HOLMES

BY Zoltan Polachek

ATTORNEY

REMOTE CONTROL ELECTRONIC TELEPHONE DIALING MEANS

Filed Sept. 18, 1953 4 Sheets-Sheet 2

INVENTOR.
FRANK G. HOLMES
BY [signature]
ATTORNEY

April 24, 1956 F. G. HOLMES 2,742,971

REMOTE CONTROL ELECTRONIC TELEPHONE DIALING MEANS

Filed Sept. 18, 1953 4 Sheets-Sheet 3

INVENTOR.
FRANK G. HOLMES
BY
ATTORNEY

April 24, 1956 F. G. HOLMES 2,742,971
REMOTE CONTROL ELECTRONIC TELEPHONE DIALING MEANS
Filed Sept. 18, 1953 4 Sheets-Sheet 4

INVENTOR.
FRANK G. HOLMES
BY
Zoltan Polachek
ATTORNEY

United States Patent Office 2,742,971

Patented Apr. 24, 1956

2,742,971

REMOTE CONTROL ELECTRONIC TELEPHONE DIALING MEANS

Frank G. Holmes, Philadelphia, Pa.

Application September 18, 1953, Serial No. 380,895

13 Claims. (Cl. 179—90)

This invention relates to new and useful improvements in devices and apparatus for facilitating the use of the telephone, and, more particularly, the aim is to provide a novel and valuable apparatus whereby a telephone instrument having a dialing means may be controlled from a remote point, as for operating the dialing means and for other purposes.

A cardinal object of the invention is to provide an apparatus as above wherein manually controlled means are included, with said means operable from a point at any remote distance desired from the telephone instrument, as, for example, a point closely adjacent to the bedside of a person ill in bed; and with said means capable of being operated to dial any telephone "number" at the moment desired to be dialed.

As is well known, the dialing means of a telephone instrument comprises a rotatable disk, sometimes called the finger wheel, selectively frictionally rotatable through a different angle according as any one of ten different dialing factors or components are to be registered; these factors being "1," "2," "3," "4," "5," "6," "7," "8," "9" and "0." Also, as the said dialing means is usually marked, there are associated, respectively with the numerical markings "2," "3," "4," "5," "6," "7," "8," "9" and "0," the letters "ABC," "DEF," "GHI," "JKL," "MNO," "PRS," "TUV," "WXY" and "Z" "Operator." So that a telephone "number" such, for instance, as HAmilton 5–6789, would be dialed first "4" (for the "H"), then "2" (for the "A"), then "5," then "6," then "7," then "8," and then "9." As will be understood, a substantially large total of different telephone numbers may be dialed, by different combinations of said factors or components with each combination comprising seven of said factors or components.

By the present invention a remote control means is provided for dialing any selected one of a substantially large total of different telephone numbers, with said means operating on the dialing means on the telephone instrument in a manner analogous to the way said dialing means is operated on manually by use of a finger or stylus held in the hand, that is, by insertion of said finger or stylus into one of the ten openings in the said rotatable disk or finger wheel and turning of the disk through the angle permitted by the relative location of said opening, with these finger-insertion and disk-rotation operations repeated six more times with at each of said times the finger or stylus being inserted into the disk opening marked with the appropriate numerical indicium.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
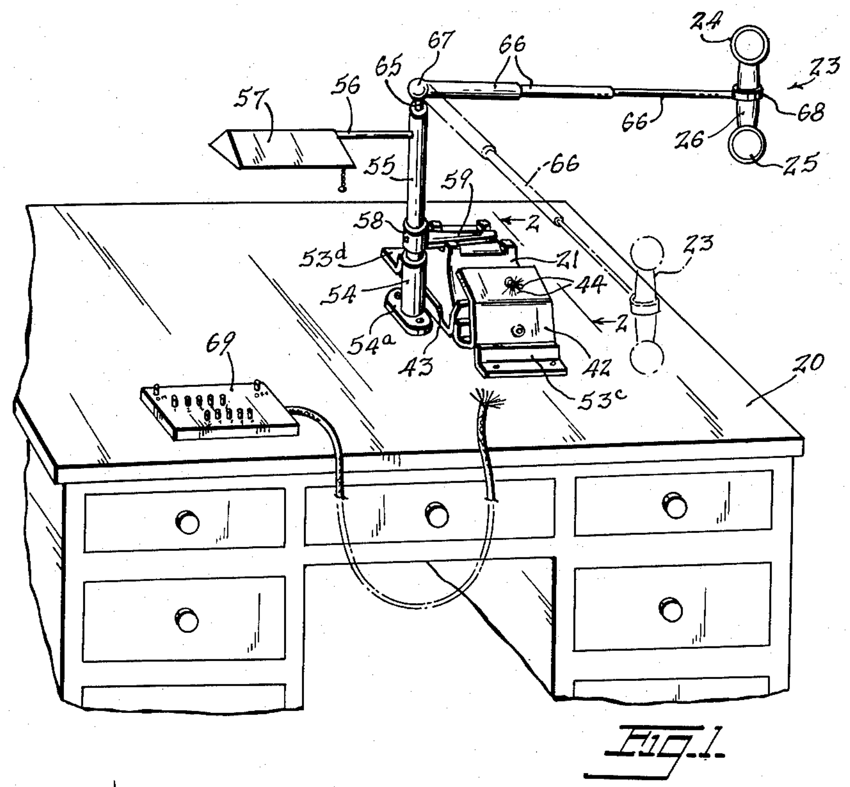
Fig. 1 is a perspective view of an article of furniture, equipped with an apparatus pursuant to the invention.

Referring now to the drawings more in detail, at 20 is indicated an article of furniture here shown as a desk such as might, for example, be in a sick room at some distance from the bed where an ill person is confined. As will be understood, the desk 20 is representative of any desired support, as a table, a shelf, etc., remote from the location of a person desiring to make use of a telephone instrument whether for receiving or sending calls.

A telephone instrument of a recent design in French type instruments is indicated at 21. As is well known, this instrument at its upper portion carries four posts 22, to establish therebetween a cradle for having placed therein while the telephone is out of use a bodily liftable handset structure 23 including at one end a transmitter 24 and at its other end a receiver 25. Said transmitter and receiver are joined by a bridge member 26. Ordinarily, between uses of the telephone, said bridge member 26 lies in the said cradle and extends across the same widthwisely of the instrument 21; and then two upwardly projecting switch buttons 27, 27 are, by the weight of the structure 23, held depressed, thereby to hold closed the talking circuit, and to hold open the ringing circuit for incoming calls. As is also well known, spring means are located inside the instrument 21, for normally urging the buttons 27 to project above the floor of the cradle thereby to open said talking circuit and close said ringing circuit.

Figure 8:
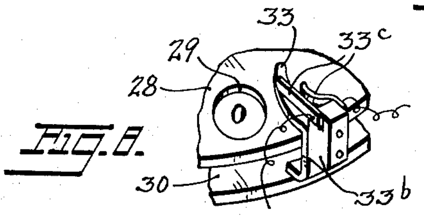
Fig. 8 is a view similar to Fig. 7, showing an attachment to said apertured part, pursuant to the invention.

The dialing means on the instrument 21 is also of a construction and manner of operation well known; the said means incorporating at 28 the aforesaid rotatable disk or finger wheel having arranged therearound at uniform spacings the aforesaid ten finger or stylus openings. Some of the latter are shown at 29 in Figs. 5 through 8. The numerical and other markings already described as respectively allotted to the ten openings 29 are all readable through said openings, with the disk 28 at normal position, because said markings are carried on the upper surface of a fixed disk 30 below the disk 28 and are so located on said surface that with the disk 28 in normal position each marking or set of markings appropriate to a particular opening 29 is directly below that opening. Thus, starting with the markings "Z Operator 0," these being not shown by being the markings below the opening 29 seen in Figs. 7 and 8, the markings "WXY 9," "TUV 8," "PRS 7," etc., extend around the disk 30, in the direction of the arrow 31 of Figs. 7 and 5, to and including the marking "1"; so that it is the markings "GHI 4," "DEF 3," "ABC 2" and "1" which will lie below, respectively, the opening 29 shown at the upper part of Fig. 5, the opening 29 next therebelow, the opening 29 next therebelow, and the opening 29 shown at the lower part of Fig. 5. The last-named four openings 29 are shown in broken lines, as the disk 28 lies, as will later be made clear, below the disk seen in Fig. 5.

In ordinary direct manual use of the disk or finger wheel 28 (the same having its pivotal mounting in a fixed drum 32 containing a return spring not shown), the disk 28, after finger or stylus insertion into a selected opening 29, is turned in the direction of said arrow 31, against the tension of said return spring, as far as permitted; that is, until said finger or stylus engages a stop bracket 33 extending over disk 28. Then, on withdrawing said finger or stylus, the spring just mentioned rotates the disk in the direction opposite to that of said arrow 31 to return it to normal position.

According to the present invention, there are used, in lieu of said finger or stylus, a plurality of electromagnetically selectively separately depressible members, each for operation at a different one of the said openings 29 in the rotatable disk 28 of the dialing means. With said disk, as usual and as herein assumed to be present, having ten openings 29, there are ten of said depressible members.

Figure 6:
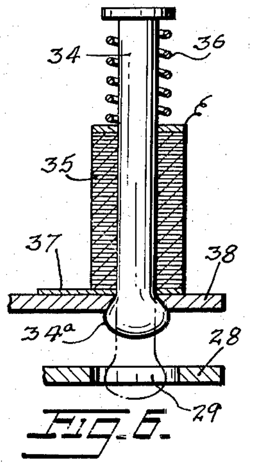
Fig. 6 is a further enlarged detail section, this taken on the line 6—6 of Fig. 5.
Figures 4, 5, 9, 10, 11:
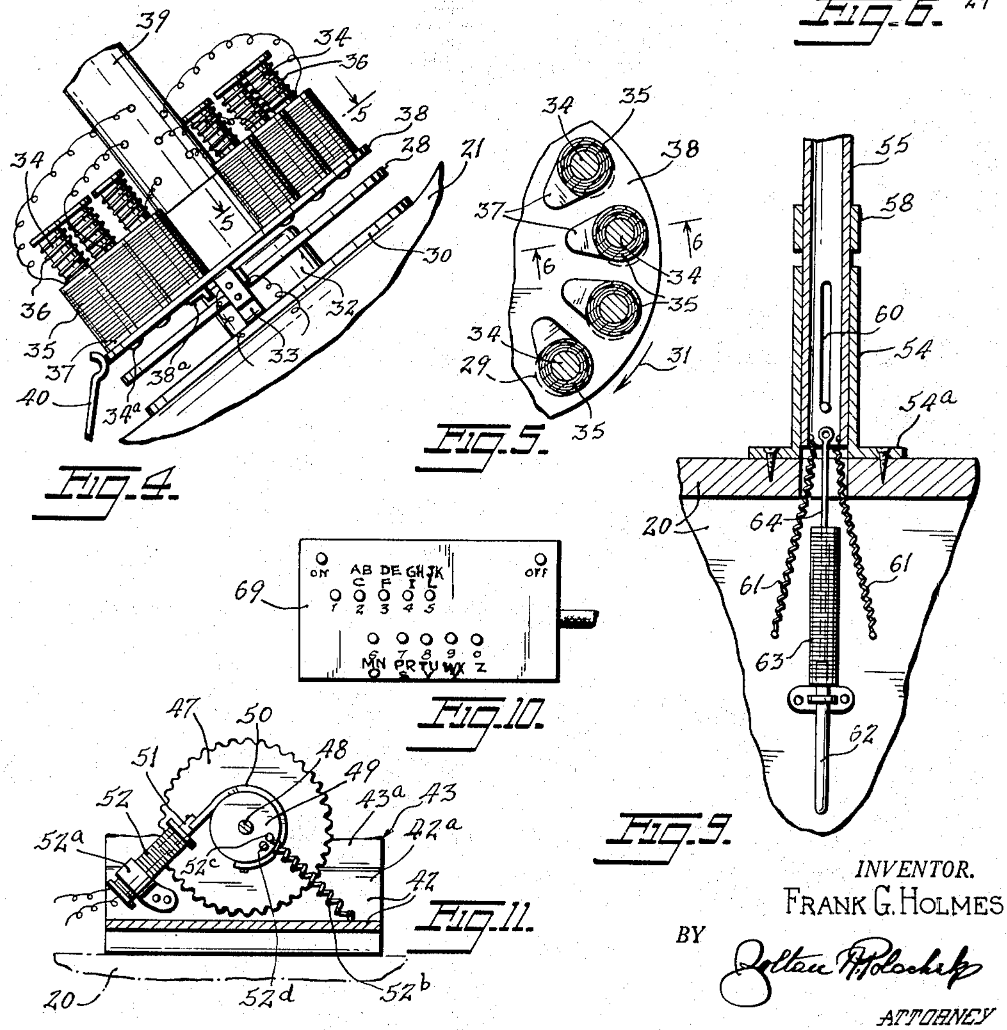
Fig. 4 is a fragmentary elevational view, showing parts as seen in Fig. 2, on an enlarged scale.
Fig. 5 is a fragmentary detail section, taken on the line 5—5 of Fig. 4.
Fig. 9 is a fragmentary detail section, taken on the line 9—9 of Fig. 3.
Fig. 10 is an enlarged top plan view of a readily portable switch box shown in perspective in Fig. 1.
Fig. 11 is a fragmentary detail section, taken on the line 11—11 of Fig. 2.

All of said depressible members are alike, each of them being the armature 34 of a solenoid 35. Each armature 34, having a spherically enlarged lower end 34$^a$, is urged to its upper position by a spring 36; and each solenoid 35 has a bracket 37 extension at its bottom whereby and as by welding said solenoid is fixed in position on an upper rotatable disk 38, with the center line of said armature eccentric relative to the related opening 29 of the disk 28; all as best shown in Figs. 4–6.

Fixedly dependent from said disk 38 is an L-bracket 38$^a$ for forcing a pair of normally closed contacts to separate each time the disk 28 is rotated, by means later explained, in the direction of said arrows 31 until the then depressed armature 34 as carried around with said disk 28 abuts the stop bracket 33 at its crescent-shaped top horizontal extension.

Referring to the just mentioned normally closed contacts, said stop bracket 33 is apertured at 33$^a$, and by way of said apertures and suitable rivets (Fig. 8), there is mounted on said bracket a block of insulation 33$^b$ carrying said contacts, these last designated 33$^c$.

Figures 2, 7:
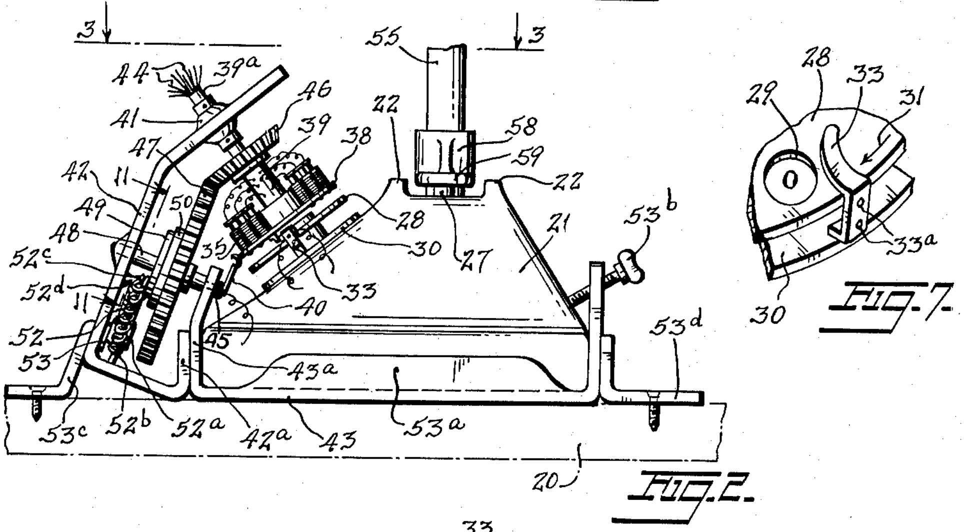
Fig. 2 is an enlarged side elevation, this being a view as though taken from the cutting plane indicated at 2—2 in Fig. 1.
Fig. 7 is a fragmentary perspective view, showing certain of the parts of the standard dialing means of a telephone instrument (with one of said parts illustrated, however, as having been twice specially apertured); which parts are also to be seen in Fig. 4.
Figure 12:
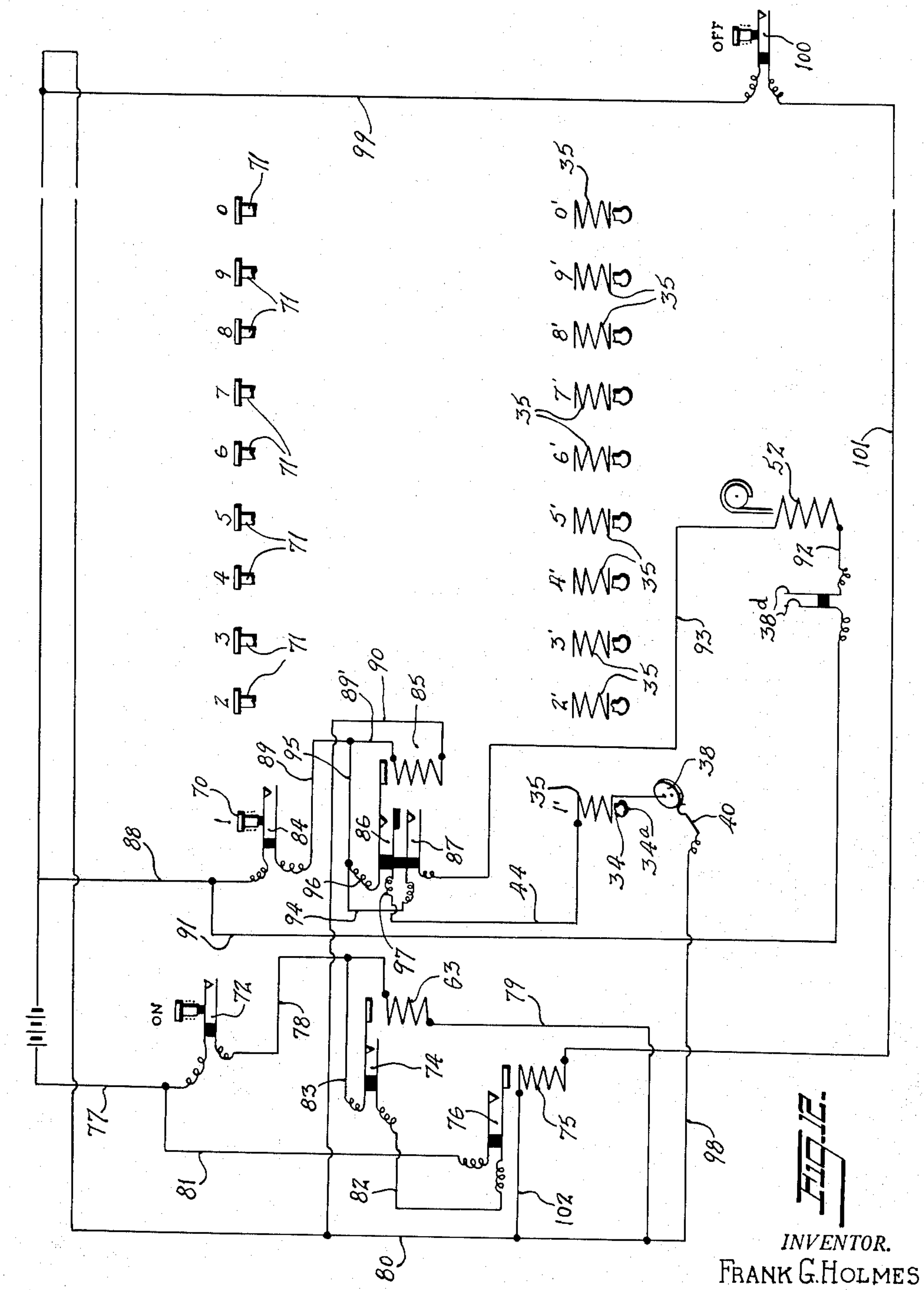
Fig. 12 is a wiring diagram, also showing, schematically, various electrically operated parts.
Figure 13:
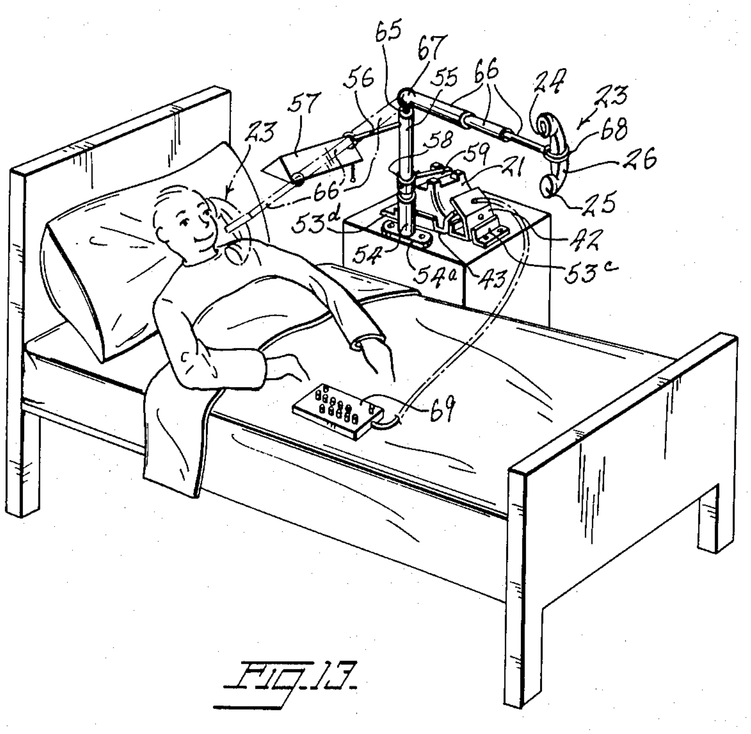
Fig. 13 is a perspective view of the device applied to a desk at a hospital bed.

The rotatable disk 38 carrying the solenoids 35 is fixed on a hollow shaft 39 having a reduced upper portion 39$^a$; and engaging the periphery of said disk is a brush 40 (Figs. 2 and 12).

A means 41 for constituting a journalling mount for the shaft 39, and also for holding said shaft against endwise movement, is shown as carried by an auxiliary bent metal frame 42 having a rear upwardly directed flange 42$^a$; said flange being attached as by welding to a main box frame 43 at a forward upwardly directed flange 43$^a$ thereof.

From a suitable current source a wire 44 goes to the coil of each solenoid 35, and the energizing circuit for each of said solenoids also includes said disk 38 and said brush 40, which brush is on an insulation mount 45 (Fig. 2) secured to said flange 43$^a$.

The said shaft 39 has ten annularly and longitudinally spaced apertures as indicated in Fig. 2, and each of said wires 44 passes through a different one of said apertures, so that all of said wires may issue from the upper open end of said shaft. During rotation of said disk 38 said wires may tend to twist slightly, but without any damage thereto or to their insulation sheathings; while by the arrangement provided, the need for ten slip rings, one for each solenoid, is avoided.

Fixed also on the shaft 39 is a bevel gear 46, and meshing with the same is a larger bevel gear 47 fixed on an auxiliary shaft 48 journalled at opposite ends in frame 42 and flange 43$^a$ as indicated in Fig. 2. Also fixed on said shaft 48 is a drum 49, and a metal ribbon 50 has an end thereof attached to the periphery of said drum as indicated in Fig. 11; said ribbon being partially wrapped around the drum and being attached at its end remote from the drum to the upper end of the armature 51 of a solenoid 52 secured to the auxiliary frame 42 by a strap bracket mounting 52$^a$ (Figs. 2 and 11).

For restoring the gear 47, and with it the disk 38, by reverse rotation, to normal position, following deenergization of the solenoid 52, a spring 52$^b$ is secured at its lower end down within the auxiliary frame 42 as shown best in Fig. 11, and is connected at its upper end to a stud 52$^c$ eccentrically mounted on drum 49; and for limiting this reverse rotation of the gear 47, there is rearwardly projected from the front wall of said frame 42 a fixed stud 52$^d$ adapted to be abutted by the stud 52$^c$ at the end of said reverse rotation of said gear. As will have been noted from the relative radii of the gears 46 and 47 and of the drum 49, only about a 55° rotation of the said drum is required to give a fractional rotation to the disk 38 the same as the maximum possible required fractional rotation of the standard disk 28 to dial even the numeral "1" in the standard dialing means; which last-named dialing requires only about a 320° rotation of said standard disk 28.

Figure 3:
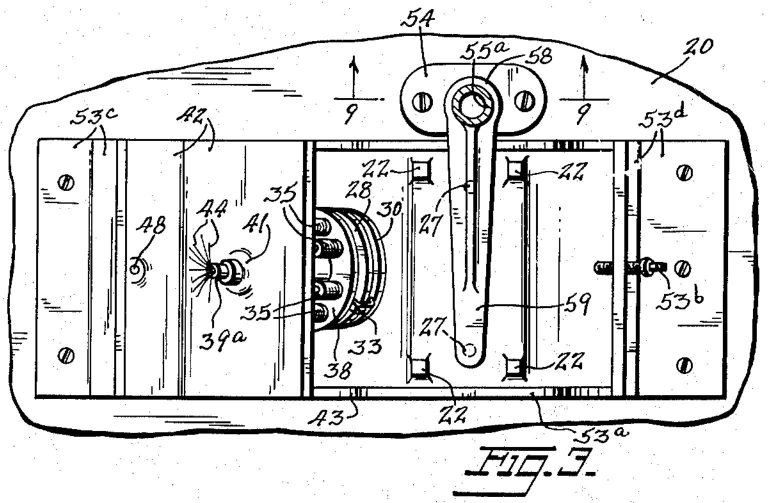
Fig. 3 is a horizontal section, taken on the line 3—3 of Fig. 2.

With the telephone instrument 21 pocketed in the main frame 43 as shown in Figs. 1–3, and therein held against sidewise shift by upstanding ears 53$^a$ at opposite sides of the floor of said frame, and therein locked in position by tightening of a thumb-screw 53$^b$, and with a forward angle strip 53$^c$ secured as by welding to the auxiliary frame 42 and a rear angle strip 53$^d$ similarly secured to the main frame 43, the telephone instrument 21 and all other parts contained in the framing structure 42—43 are fixedly mounted as a unit at any desired location, as on the top of the desk 20, and as by screws as indicated in Figs. 2 and 3.

Also secured to the top of the desk 20 or the like is the lower fixed section 54 of a telescopic standard; said section being thus secured by an integrally carried base plate 54$^a$ and suitable fastening members. The inner raisable section of said standard is designated 55, and said section 55 has an offset arm 56 which may carry a lamp as shown at 57 (Fig. 1).

For holding depressed the two switch buttons 27 of the instrument 21 while the standard section 55 is normally fully lowered, thereby to function as does the handset 23 when in the usual case it is left to rest in the cradle at the top of said instrument, a collar 58 is fixed on said section 55 and integrally offset from said collar is an arm 59. A pin and slot connection 60 (Fig. 9) is provided between the two standard sections 54 and 55 to limit upward extension of the section 55. A pair of springs 61 are connected to desk 20 as shown so as always to urge said section 55 to lowered position; and also connected to the lower end of said section is the upper end of the armature 62 of a normally deenergized solenoid 63, this connection being effected by way of a connecting rod 64 of non-magnetic material.

Fixed at its lower end portion in the upper end of the said section 55 is a post 65, carrying at its top a telescopic arm 66 adapted to be laterally manually offset from the section 55 as desired; there being a ball and socket joint 67 for permitting the arm 66 to be extended at any angle desired. The friction in said joint 67 is such as to maintain the parts in any setting manually effected; and there is similar friction in the arm 66 between the several sections thereof for permitting said arm to be varied in effective length. At the outer end of the arm 66 is a clasp ring 68 for being tightened suitably to seize the bridge member 26 of the handset 23; and the said friction between the two outer sections of the arm 66 is such that one may be rotated relative to the other to maintain any desired angular relation. Thus the handset 23 is supported for elevation when desired, and also for any amount of extension, and also on a universal joint as it were, for any desired location relative to the mouth and an ear of a person at a relatively remote location from the instrument 21.

For remote control of the electromagnetically operating mechanism for actuating pursuant to the invention the standard dialing means of a telephone instrument, twelve switches are provided, these being selectively manually operable, and all shown as mounted in a portable switch box 69 (Figs. 1 and 10).

*Operation*

To receive a telephone call, announced by a bell ring, the push button marked "On" shown on box 69 is momentarily depressed. Thereby, as will later be made plain, the solenoid 63 is energized, and the standard by means of rod 64 is upwardly lengthened by rise of the upper standard section 55; thus raising the arm 59 above the switch buttons 27 of the instrument 21 and so closing the talking circuit.

When the conversation is finished, the push button "Off" of the box 69 is momentarily depressed, thereby, as will also be later explained, deenergizing the solenoid 63.

To dial a desired number, first the push button "On" is momentarily depressed, to effect the results just above stated, and then, sequentially, there are momentarily depressed, one by one, the required buttons of the ten other push buttons shown as carried by the switch box 69. Said ten other push buttons, it will be noted, are marked "1," "2," "3," and so on, to "0"; each being individually in circuit with the appropriate one of the solenoids 35 carried by the disk 38 and located over the opening 29 in the standard dial disk 28 below which is, as already hereinabove explained, the marking "1," "2," "3," etc. Each time one of said ten switch buttons is momentarily depressed, three things occur; first, the appropriate solenoid 35 is energized, thereby to thrust the lower end portion 34ᵃ of its armature 34 into the appropriate aperture 29 of the standard disk 28, and then, a fraction of an instant later, the solenoid 52 is energized thereby to rotate the disk 38, and with its said disk 28, until said armature 34 abuts the finger-stop bracket 33 (at which instant the L-bracket 38ᵃ dependent from the disk 38 forces apart the normally touching contacts 33ᶜ), and, finally (see the third succeeding paragraph), as a result of establishing a break at said contacts 33ᶜ in a "locking circuit" for a relay energized following closing of the switch at said depressed one of said ten switch buttons, said solenoids 35 and 52 are deenergized.

On said deenergization of said solenoid 35, its armature 34 is retracted from engagement with the disk 28 by spring 36, ready clear-away of the armature 34 from said disk being permitted by the bulbous bottom portion 34ᵃ of said armature; and, simultaneously, on said deenergization of the solenoid 52, the spring 52ᵇ (Fig. 11) restores the gear 47 to normal position, with the stud 52ᶜ on the drum 49 now abutting the fixed stop-stud 52ᵈ, and so restoring the disk 38 to normal position.

When the conversation is finished, the push button "Off" is momentarily depressed, to cause deenergization of the solenoid 63, as above.

The locking circuit, relay and switch referred to in the concluding portion of the third preceding paragraph are illustrated in Fig. 12, and they will be understood from the detailed description of Fig. 12 now to follow.

In Fig. 12, as in Fig. 10, the ten push buttons other than the "On" and "Off" ones, are indicated by the numerals "1," "2," "3" and so on; in accordance with explanations hereinabove already given. In Fig. 12, further, wherein the series of coils for the ten solenoids 35 are shown, the thus indicated solenoid 35 at the extreme left of the series is the solenoid 35 to be energized by depression of the "1" button, while the other nine solenoids 35 are the solenoids 35 each of which is to be energized by depression of a different one of the other nine push buttons. To indicate this relationship between the push buttons "2," "3," "4," etc. to "0," and, respectively, the last-named nine push buttons, the latter are marked "2′," "3′," "4′," etc. to "0′."

Said push button "1" is additionally designated 70 in Fig. 12 and in the same figure the other nine of the push buttons "2," "3," etc. are additionally designated 71.

*Depression of the "On" push button*

This effects closing of a switch 72, thereby to energize the solenoid 63 thus elevating the section 55 of the standard carrying the handset 23 and so closing the talking circuit at the instrument 21. The contacts 74 of the solenoid 63 are held closed by a locking circuit interposed in which is a solenoid 75 having a pair of normally closed contacts 76. The energizing circuit for the solenoid 63 includes leads 77, 78, 79 and 80; and said locking circuit includes said lead 77 and leads 81, 82 and 83 to the lead 79 and thence to the lead 80.

Said locking circuit is broken, to deenergize the solenoid 63, by energization of the said solenoid 75 effected as will below be made clear when explanation is made of what happens on depression of the "Off" push button.

*Depression of the "1" button 70*

This effects closing of a switch 84, thereby to energize a relay 85, for first closing an upper pair of normally open contacts 86 and a fraction of an instant later closing a lower pair of normally open contacts 87. The energizing circuit for the relay 85 includes leads 88, 89, 89′ and 90 to the lead 80. Said contacts 86 and 87 are held closed by a locking circuit for the relay 85 which includes leads 91, 92, 93, 94 and 95 to the lead 89′. Thus, on depression of said "1" button, that one of the solenoids 35 at the extreme left of the series in Fig. 12 is energized (thereby to depress its armature 34, Fig. 6, to lock the disk 38 to the disk 28 at the "1" opening 29 of the latter); and, immediately thereafter, the solenoid 52 is energized, to cause rotation of said disks until at the standard limit of dialing-direction rotation of the disk 28 the contacts 33ᶜ are forced apart (by the L-bracket 38ᵃ, Fig. 4). The energizing circuit for said relay 35 includes a lead 97, from the lower one of the contacts 86 of the relay 85, the particular wire 44 (compare 44 in Figs. 2 and 3) for said relay 35, the disk 38, the brush 40, and a lead 98 to the lead 80. The energizing circuit for the relay 52 is the just above described locking circuit for the relay 85, as in said locking circuit is interposed said relay 52.

Said forcing apart of the contacts 33ᶜ breaks said locking circuit; and consequently at that instant said relay 85, the last-named relay 35 and the relay 52 are deenergized; with the result that the spring 52ᵇ (Fig. 11), restores the disk 38 to normal position simultaneously with restoration of the standard dialing disk 28 to normal position by action of the standard return spring serving the same.

Now, therefore, the dialing of the second factor or component of the telephone "number" to be dialed may be proceeded with, as by depressing the appropriate one of the ten push buttons "1," "2," "3," etc. These button depressions are continued until the desired telephone number has been completely dialed.

In order to simplify the drawing and keep the description as brief as possible, the connections like the lead 88 and connections parallel thereto and respectively going to the nine switches like the switch 84 respectively associated with the nine push buttons 71 are not shown. As will be understood, however, each of said connections paralleling the connection 88 leads to a different one of nine relays each like the relay 85, but in each case with a lead corresponding to the wire 44 going to a different one of the nine relays 35 other than the one at the extreme left in Fig. 12; while all the leads corresponding to the lead 93 join said lead 93 before the latter reaches the solenoid 52, whereby, on breaking of the locking circuit including said lead 93 or breaking of the corresponding locking circuit provided for any one of the said nine relays like the relay 85, said relay 52 is energized, for the purposes hereinabove explained.

*Depression of the "Off" button*

When this push button is depressed, switch 100 is closed and the solenoid 75 is energized by way of a circuit now closed including leads 99, 101 and 102 to the lead 81. Thereby the contacts 74 are moved apart, and so the locking circuit for the solenoid 63 is broken, with the consequence that the upper section 55 of the standard is lowered by its springs 61 (Fig. 9) to carry down the arm 59 to depress the switch buttons 27 at the top of the instrument 21.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position.

2. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, said electrically actuated coupling means incorporating a plurality of solenoids of a number equal to the number of apertures in said wheel, all of said solenoids being carried by said support.

3. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, said electrically actuated coupling means incorporating a plurality of solenoids of a number equal to the number of apertures in said wheel, all of said solenoids being carried by said support and each of said solenoids having a rod-like armature extended at one end through said support and spaced from but directed toward one of said apertures with said support and wheel in normal positions, the parts being so shaped and arranged that on energization of any solenoid its armature is endwisely moved to engage the assigned aperture.

4. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, said electrically actuated coupling means incorporating a plurality of solenoids of a number equal to the number of apertures in said wheel, all of said solenoids being carried by said support and each of said solenoids having a rod-like armature extended at one end through said support and spaced from but directed toward one of said apertures with said support and wheel in normal positions, the parts being so shaped and arranged that on energization of any solenoid its armature is endwisely moved to engage the assigned aperture, said support being above said wheel.

5. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, said electrically actuated coupling means incorporating a plurality of solenoids of a number equal to the number of apertures in said wheel, all of said solenoids being carried by said support and each of said solenoids having a rod-like armature extended at one end through said support and spaced from but directed toward one of said apertures with said support and wheel in normal positions, the parts being so shaped and arranged that on energization of any solenoid its armature is endwisely moved to engage the assigned aperture, said support being above said wheel, said end of said armature being its lower end.

6. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, said electrically actuated coupling means incorporating a plurality of solenoids of a number equal to the number of apertures in said wheel, all of said solenoids being carried by said support and each of said solenoids having a rod-like armature extended at one end through said support and spaced from but directed toward one of said apertures with said support and wheel in normal positions, the parts being so shaped and arranged that on energization of any solenoid its armature is endwisely moved to engage the assigned aperture, said support being above said wheel, said end of said armature being its lower end and said lower end being bulbous.

7. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, said electrically actuated coupling means incorporating a plurality of solenoids of a number equal to the number of apertures in said wheel, all of said solenoids being carried by said support and each of said solenoids having a rod-like armature extended at one end through said support and spaced from but directed toward one of said apertures with said support and wheel in normal positions, the parts being so shaped and arranged that on energization of any solenoid its armature is endwisely moved to engage the assigned aperture, there being a means operating in response to arrival of said support and wheel at said terminus for causing disengagement of said armature from said aperture.

8. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said wheel at the stop device of said dialing means for deenergizing said solenoid and for restoring said support to normal position.

9. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, said electrically actuated coupling means incorporating a plurality of solenoids of a number equal to the number of apertures in said wheel, all of said solenoids being carried by said support and each of said solenoids having a rod-like armature extended at one end through said support and spaced from but directed toward one of said apertures with said support and wheel in normal positions, the parts being so shaped and arranged that on energization of any solenoid its armature is endwisely moved to engage the assigned aperture, said solenoids being arranged on said support with the center lines of said armatures offset from the centers of said apertures when said support and wheel are in normal positions.

10. A remote control apparatus for actuating the apertured finger wheel of the dialing means of a telephone instrument, comprising a rotary disk, means for mounting said disk for concentric rotation with said wheel, a plurality of depressible members carried by said disk, there being as many such members as there are apertures in said wheel and each of said members being movably mounted on said disk for depression to engage a different one of said apertures when both said wheel and said disk are in normal positions, a manually actuable means for first depressing any selected one of said members to cause the same to engage the aperture assigned thereto and then for rotating said disk and with it said wheel as far as permitted by the stop device of said dialing means, and means operating in response to arrival of said wheel at said stop device for disengaging said member from said aperture and for causing reverse rotation of said disk to return it to normal position during return of said wheel to normal position.

11. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, a means independent of the handset of the telephone instrument for normally holding open the talking circuit of the telephone, and a means for abnormally elevating a mounting means for said holding means and for then and thereby permitting said talking circuit to be closed.

12. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, a means independent of the handset of the telephone instrument for normally holding open the talking circuit of the telephone, and a means for abnormally elevating a mounting means and for then and thereby permitting said talking circuit to be closed, the last-named means including an electrically operated means.

13. A remote control apparatus for actuating the apertured finger wheel of the dialing means of a telephone instrument, comprising a support mounted for rotation about an axis concentric with the axis of rotation of said wheel, manually controlled and electrically actuated means for temporarily coupling said support and said wheel at any selected one of the apertures of said wheel, electrically operating means for then fractionally rotating said support and with it said wheel as thus coupled thereto, and means functioning in response to arrival of said support and wheel at a predetermined terminus of rotation for thereupon restoring said support to normal position, a means independent of the handset for normally holding open the talking circuit of the telephone, and a means for abnormally elevating a mounting means and for then and thereby permitting said talking circuit to be closed, the last-named means including a solenoid and a telescopic unit one section of which is connected to the armature of said solenoid.

References Cited in the file of this patent

UNITED STATES PATENTS

| | | |
|---|---|---|
| 2,088,065 | Holden et al. | July 27, 1937 |
| 2,579,983 | Thornton | Dec. 25, 1951 |